US 7,723,441 B2
May 25, 2010

(12) United States Patent
Shustack

(10) Patent No.: US 7,723,441 B2
(45) Date of Patent: May 25, 2010

(54) LOW OUT-GASSING ROOM TEMPERATURE CURABLE RUBBERY POLYMER, PREPARATION THEREOF AND DEVICE COMPRISING SAME

(75) Inventor: Paul John Shustack, Elmira, NY (US)

(73) Assignee: Corning Incorporated, Corning, NY (US)

( * ) Notice: Subject to any disclaimer, the term of this patent is extended or adjusted under 35 U.S.C. 154(b) by 753 days.

(21) Appl. No.: 11/640,798

(22) Filed: Dec. 18, 2006

(65) Prior Publication Data
US 2007/0155850 A1 Jul. 5, 2007

Related U.S. Application Data

(60) Provisional application No. 60/755,672, filed on Dec. 29, 2005.

(51) Int. Cl.
*C08F 8/00* (2006.01)
(52) U.S. Cl. ............... 525/338; 525/331.7; 525/332.5; 525/339; 525/384
(58) Field of Classification Search ............... 525/338, 525/339, 384
See application file for complete search history.

(56) References Cited

U.S. PATENT DOCUMENTS

| | | | | |
|---|---|---|---|---|
| 4,855,382 | A | 8/1989 | Vanhaeren | 528/45 |
| 5,352,712 | A | 10/1994 | Shustack | 522/31 |
| 5,382,604 | A | 1/1995 | Erickson | 522/158 |
| 5,491,193 | A | 2/1996 | Erickson | 525/65 |
| 5,691,414 | A | 11/1997 | Kübler et al. | 525/99 |
| 5,837,749 | A | 11/1998 | Erickson et al. | 522/31 |
| 6,346,330 | B1 | 2/2002 | Huang et al. | 428/414 |
| 6,664,318 | B1 | 12/2003 | Bymark et al. | 524/261 |
| 6,726,856 | B2 | 4/2004 | Glausch | 252/520 |
| 6,903,144 | B2 | 6/2005 | Erickson et al. | 522/100 |
| 2004/0024079 | A1 | 2/2004 | Erickson et al. | 522/3 |
| 2004/0092618 | A1 | 5/2004 | Coykendall et al. | 522/6 |

FOREIGN PATENT DOCUMENTS

| | | |
|---|---|---|
| EP | 302 620 | 8/1987 |
| JP | 2001-057065 | 2/2001 |
| JP | 2001-155855 | 6/2001 |
| JP | 2001-163931 | 6/2001 |
| JP | 2001-164737 | 6/2001 |
| JP | 2001155855 | 10/2001 |
| JP | 2002-106719 | 4/2002 |
| WO | 9611241 | 4/1996 |
| WO | 01/81494 | 11/2001 |

OTHER PUBLICATIONS

E.A. Boulter, M. Cohen, M.L. Deviney, *Proceedings of the Electrical/Electronics Insulation Conference* (1997), 23$^{rd}$, 249-53.
R.C. Benson, T.E. Phillips, N. DeHaas, *Proc.-Electron. Compon. Conf.* (1989), 39$^{th}$, 301-8.
Also R.C. Benson, T.E. Phillips, N. DeHaas, M. Bonneau, *Int. SAMPE Electron, Conf.* (1990), 4 (Electorn). Mater.-Our Future), 267-81.
C.T. Mooney, J.C. Bolger, *Natl. SAMPE Symp. Exhib.*, [*Proc.*], (1984), 29$^{th}$ (Technol. Vectors), 639-50.
Leoni; FAT1PEC Congress (2000), 25$^{th}$ (vol. 1), 253-265.
J. Kuczynski, *J. of Adhesion* (1996), 56 (1-4), 107-119.
R.C. Benson, B.H. Nall, N. DeHaas, B.M. Romenesco, B.M. Charles, H.K. Colten, *Electronic Mater, Processes, Int. SAMPE Electronic Conf.* (1987), 637-48.
R.C. Benson, B.H. Nall, N. DeHaas, B.M. Romenesco, B.M. Charles, H.K. Colten, *SAMPE journal*; Nov./Dec. (1987), 27-33.

*Primary Examiner*—Bernard Lipman
(74) *Attorney, Agent, or Firm*—Robert P. Santandrea; Siwen Chen

(57) ABSTRACT

Disclosed is polymer materials essentially free of silicone capable of room-temperature thermal cure and when cured having low modulus, low out-gassing rate. The material before cure typically comprises three components: (i) a cationically curable component comprising the backbone of a hydrocarbon-based rubber material essentially free of carbon-carbon double bonds and triple bonds; (ii) a hydroxyl-containing component having at least two hydroxyl groups per molecule; (iii) an initiator component having essentially no volatility at room temperature and also yield products after polymerization that have minimal or no volatility at room temperature; (iv) an optional viscosity adjustment component either homopolymerizable or capable of copolymerizing with the photo or electron beam curable material component of (i); and (v) an optional non-alkaline inert filler. Also disclosed are process for making such cured material and devices comprising such cured polymer materials.

33 Claims, 3 Drawing Sheets

LOW OUT-GASSING ROOM TEMPERATURE CURABLE RUBBERY POLYMER, PREPARATION THEREOF AND DEVICE COMPRISING SAME

CROSS-REFERENCE TO RELATED APPLICATIONS

The present invention claims the benefit under 35 U.S.C. §119 of the earlier filing date of U.S. Provisional Patent Application Ser. No. 60/755,672, filed on Dec. 29, 2005 by Paul J. Shustack, entitled "LOW OUT-GASSING ROOM TEMPERATURE CURABLE RUBBERY POLYMER, PREPARATION THEREOF AND DEVICE COMPRISING SAME," the content of which is relied upon and incorporated herein by reference in its entirety.

FIELD OF THE INVENTION

The present invention relates to room-temperature curable, rubbery material, preparation thereof and device comprising the cured material. In particular, the present invention relates to cationically room-temperature curable rubbery material that after being cured exhibits exceedingly low outgassing of volatile organic materials and/or silicone, as well as preparation thereof and device comprising the cured material. The polymer of the present invention is useful, for example, as an adhesive, sealant, or lens-potting material.

BACKGROUND OF THE INVENTION

There are a number of applications where it is necessary to bond materials together using adhesives and it is undesirable for the adhesive to give off any volatile organic materials after cure. The process of evolving volatile organic materials after cure is often called outgassing or offgassing. Examples of such applications are in the area of food packaging where the outgassed compounds can impart an off-taste to the packaged food material. In the area of optics and photonics, outgassed compounds can condense on optical surfaces and negatively affect the transmission of light.

For many adhesive or lens potting applications, it is necessary to bond together materials (substrates) of different coefficients of thermal expansion. In these applications, the adhesive or potting material must allow for the expansion and contraction of the two different substrates as the temperature changes yet still maintain the adhesion of the two substrates together. This requires the use of a soft, low modulus, low $T_g$ rubbery type material. The ability to formulate materials that cure to soft, compliant, rubber-like solids and yet still have low outgassing after cure is very difficult. This is especially true if the cured material also has to have excellent thermal, oxidative and hydrolytic stability.

Many room temperature vulcanized (RTV) silicone materials cure to soft, compliant rubber-like solids that have good thermal, oxidative and hydrolytic stability but they still evolve an unacceptable amount of volatiles after cure. The outgassed products of the RTV silicones are usually low molecular weight, sometimes cyclic, siloxanes. These materials are particularly problematic because if they condense on surfaces, they are difficult to remove due to their very low surface tension. Contamination of optical surfaces by those products is especially a concern when RTV silicones are used as adhesive or lens-potting material in optical devices where high irradiation fluence and/or short wavelength irradiation is used. Such surface contamination is highly undesirable and should be avoided in precision optical systems, such as inspection systems used in the semiconductor industry, for example, a lithographic inspection system.

Other materials often considered are polysulfides, polyurethanes, and hydrocarbon rubbers like polybutadiene, polyisoprene, etc. These products do not possess sufficient thermal, oxidative and hydrolytic stability for applications where the rubbery material must remain rubbery throughout its entire lifetime which may be as long as 30 years. Such applications are in the optics and photonics area where in order to simulate 30 year lifetime, materials are subjected to various accelerated aging tests like exposure to conditions of 85° C. and 85% RH for a minimum of 500 hours and up to as long as 2000 hours.

It is also advantageous for the material to be curable with actinic radiation such as UV or visible light or an electron beam. This enables the material to be applied as a liquid. Afterwards optical alignments, or other positional adjustments can be made. When the adherends are in their optimized position, the actinic radiation can be turned on which cures the materials quickly (within seconds or minutes) and with minimal amount of heat. This process retains the delicate alignment of the adherends.

Engineering solutions have been proposed to eliminate or mitigate the outgassed products from adhesives. These involve novel joint designs that allow for elimination of the outgassed materials from the adhesive into non-sensitive areas (JP 2001155855 and JP 2002106719). In another case, the surface of the adhesive material is coated with an impervious inorganic layer that seals in possible outgassed products (US2001028062). Other methods involve heat and/or vacuum treatments of the cured adhesive to remove possible outgassed products prior to final assembly of the device. All of these methods require extra steps that are unnecessary if a true low outgassing adhesive, sealant, or potting compound were available.

JP 2002146230 by H. Kawakami et al. describes an adhesive composition that is for semiconductor-mounted circuit boards and devices therewith. This composition gives a B-stage adhesive film containing less volatile components. However, the composition is not UV curable, contains MEK solvent, and is based on bisphenol A epoxy and phenolic resins which require heat to cure and cure to hard, non-flexible, thermoset polymers.

E. A. Boulter et al. claims zero volatile release from their high service temperature polyether amide thermoset resins. These materials are not UV curable and require a cure schedule of 1 hour at 177° C. followed by a postcure at 225° C. The final cured properties resemble that of cured bisphenol A type epoxies. See E. A. Boulter, M. Cohen, M. L. Deviney, *Proceedings of the Electrical/Electronics Insulation Conference* (1997), 23rd, 249-53.

JP 2001164737 by I. Tanaka et al. describes using low out-gas adhesives to make floor sheets useful for clean rooms. The adhesives are of the two component epoxy resin-polyamideamine class. Such materials require the mixing of the two parts (an extra manufacturing step), are not photocurable, and cure to form polymers that are not low $T_g$ rubbers.

JP 2001057065 by K. Fukuda et al. describes sealant compositions for computer hard disc drives that claim no gas volatilization, good sealability and adhesive strength. EP302620 by G. M. Vanhaeren describes a crosslinkable hot-melt adhesive containing a polyol and a blocked isocyanate that provides a flexible heat-resistant bond without forming volatiles. However, both of the above materials must be applied as hot melts and the high temperatures involved would negatively affect the delicate alignment required for many optical devices.

R. C. Benson et al. and C. T. Mooney et al. investigated the measurement of volatile organic species that evolve during cure and after post-cure processing of epoxy or polyimide based die attach adhesives. Similar studies were performed by R. C. Benson et al. on adhesives for microelectronics. These formulations are not photocurable and also do not cure to the soft rubbery type polymers required for the application. See R. C. Benson, T. E. Phillips, N. DeHaas, *Proc.-Electron. Compon, Conf.* (1989), 39th, 301-08. See also R. C. Benson, T. E. Phillips, N. DeHaas, M. Bonneau, *Int. SAMPE Electron, Conf.* (1990), 4 (Electorn). Mater.-Our Future), 267-81. See also C. T. Mooney, J. C. Bolger, *Natl. SAMPE Symp. Exhib., [Proc.]*, (1984), 29th (Technol. Vectors), 639-50.

R. Leoni describes adhesives that have very low emissions of volatile organic compounds. Such adhesives are high tack, contact adhesives intended for floor coverings, tiles, carpets, vinyl sheeting, etc. These materials are not photocurable and are not suitable for this application due to their permanent tackiness. See R. Leoni; FATIPEC Congress (2000), 25th (Vol. 1), 253-265.

J. Kuczynski studied the possibility of eliminating the outgassing from UV curable adhesives. Such outgassed products were shown to corrode thin film magnetic discs. The volatility of the corrosive species was dependent on the adhesive's glass transition temperature which varied linearly with flexibilizer concentration. Thermogravimetric analysis revealed that outgassing was reduced an order of magnitude in adhesives containing reduced concentrations of polycaprolactone based flexibilizer. See J. Kuczynski, *J. of Adhesion* (1996), 56 (1-4), 107-119. For the current application, it is desirable to simultaneously have a low $T_g$ and low outgassing. Also, polycaprolactone type materials are undesirable due to their inherent hydrolytic instability.

Finally, JP 2001163931 by Y. Arai and T. Nemoto describes photocurable sealing compositions generating a reduced amount of volatile gas for electronic devices. Such compositions are based on a high MW (~50,000) urethane (meth) acrylate synthesized from a polypropylene glycol extended bisphenol A diol, tetrahydrofurfuryl acrylate, and phenoxy ethyl acrylate. Such compositions would not have the outstanding thermal and oxidative stability or the higher, inherent hydrophobicity of the present invention.

However, it has been found that photo- or electron beam-curable adhesives cannot be conveniently employed where actinic radiation cannot normally reach. For example, when potting lens elements to make optical systems, adhesives constantly have to be used in such locations. Therefore, a low-outgassing room-temperature thermally curable adhesive would be an ideal substitute.

Riegler, B., Meyer, J. International SAMPE Symposium and Exhibition (2004), 49(SAMPE 2004), 1553-1567 discuss a silicone-based, low outgas, pressure sensitive adhesive for aerospace applications. The materials are claimed to pass the ASTM-E-595 (same as NASA Reference Pub. No. 1124) outgassing requirements. JP11181282 and JP11100500 also claim a low outgassing silicone/epoxy based, low outgassing composition. However, our experience is that even though silicone-based material compositions can be low in out-gassing, they are prone to contaminating optical surfaces beyond the adhesive bondlines via surface migration. The low surface tension nature of silicone-based materials strongly favors surface migration of substituents of the compositions into areas beyond the bondlines and into areas where their presence is undesirable (e.g. optical surfaces).

Low outgassing thermoplastic polymers, hot melt adhesive, and thermally curable compositions, are known. However, these are undesirable in this application because they require heat to apply and/or cure.

Lastly, low outgassing, low temperature curing polymeric materials that cure to hard, high $T_g$ materials are also known.

There remains a genuine need of an adhesive material that is room-temperature thermally curable, and that upon being cured forms a material with low outgassing rate, low modulus and low $T_g$ that is suitable for use in, inter alia the optics area. There also remains a genuine need of devices, especially optical devices, comprising such cured adhesive material.

SUMMARY OF THE INVENTION

Thus, according to a first aspect of the present invention, it is provided a material system essentially free of silicone consisting essentially of the following components, or a mixture, a blend or a reaction product thereof:
- (i) a cationically curable material component comprising the backbones of a completely or substantially completely hydrogenated hydrocarbon based rubber material completely or substantially free of carbon-carbon double and triple bonds;
- (ii) (ii) a hydroxyl-containing component having at least two hydroxyl groups per molecule;
- (iii) (iii) an initiator component having essentially no volatility at room temperature and also yielding products after polymerization that have minimal or no volatility at room temperature;
- (iv) (iv) an optional viscosity adjustment component either homopolymerizable or capable of copolymerizing with the cationically curable material component of (i); and
- (v) (v) an optional non-alkaline inert filler;

wherein when all the components are mixed together, the material system is capable of thermal cure at around room temperature to form a rubbery polymer material that is low-outgassing at room temperature.

In certain embodiments of the material system of the present invention, the cationically curable material component of (i) is a functionalized material selected from the group consisting of: functionalized polybutadiene, functionalized polyisoprene, functionalized polyethylene propylene rubber and combinations thereof, which material comprises a backbone completely hydrogenated or substantially completely hydrogenated and completely or substantially completely free of carbon-carbon double and triple bonds.

In certain embodiments of the material system of the present invention, the cationically curable material component of (i) is functionalized by at least one polymerizable terminal or pendant group selected from: cycloaliphatic epoxy, episulfide, epoxidized olefins, epoxy, glycidyl ether, oxirane, oxetane, propenyl ether, vinyl ether and compatible mixtures and/or combinations thereof.

In one particular embodiment of the material system of the present invention, the cationically curable material component of (i) is functionalized by at least one epoxy terminal or pendant group. In one particular embodiment, component (i) is a polymer having a primary hydroxyl functionality at one end and an epoxidized diene functionality at the other end.

In one embodiment of the material system of the present invention, the initiator component (iii) is selected from the following compounds and/or mixtures in purified and/or diluted form:
triarylcyclopropenylium salts;
tetrakis(pentafluorophenyl) borate, gallate, aluminate and indate salts;

and compatible mixtures and/or combinations thereof. In one particular embodiment of the material system of the present invention, the initiator component (iii) consists essentially of triphenylcyclopropenylium hexafluoro antimonate.

In one embodiment of the material system of the present invention, the non-alkali inert filler is an inorganic filler selected from the group consisting of alumina, crystobalite, clay, mullite, zircon, zirconia, quartz, silica, with or without surface modification and compatible mixtures and combinations thereof.

In one embodiment of the material system of the present invention, the material system is a polymer thermally cured at around room temperature.

In one embodiment of the material system of the present invention, the material system, before cure, is also photo- and/or electron-beam-curable.

In one embodiment of the material system of the present invention, the material system, after thermal curing at around room temperature, forms a cured polymer having a $T_g$ of equal to or lower than 25° C.

In one embodiment, the material system of the present invention comprises two separate parts, with component (i) comprised in the first part, and components (ii) and (iii) comprised in the second part.

A second aspect of the present invention relates to a process for producing a cured material system having low outgassing rate and low modulus between 25 and 10,000 psi ($1.7 \times 10^5$ to $6.8 \times 10^7$ Pa) and essentially free of silicone, comprising the following steps of:
  (A) providing a cationically polymerizable material (i), said material comprising the backbone of a completely or substantially completely hydrogenated hydrocarbon rubber material completely or substantially completely free of carbon-carbon double bond and triple bond;
  (B) mixing the material (i) with an initiator (ii) having essentially no volatility at room temperature and also yielding products after polymerization that have minimal or no volatility at room temperature; a hydroxyl-containing component (iii) comprising at least two hydroxyls per molecule; and an optional non-alkaline inert filler (iv); and
  (C) thermally curing the mixture resulting from step (B) to form a material system having low outgassing rate and low modulus.

In one embodiment of the process of the present invention, step (A) comprises the following steps:
  (A1) providing a material (i') having reactive terminal and/or pendant groups, wherein said material (i') comprises the backbone of a completely or substantially completely hydrogenated hydrocarbon-based rubber completely or substantially completely free of carbon-carbon double bond and triple bond; and
  (A2) modifying the rubber material (i') into material (i) by introducing cationically polymerizable terminal and/or pendant groups to the rubber material (i') by allowing the reactive terminal and/or pendant groups of (i') to react with agents capable of producing cationically-polymerizable groups at the location of the reactive terminal and/or pendant groups.

The material system of the present invention can be used as an adhesive or sealant. Such use can be advantageously in applications where low outgassing of the adhesive is required. For example, the material system of the present invention can be used in clean rooms. Preferably, the material system of the present invention is used in devices containing elements susceptible and sensitive to outgassed species from the materials, such as lenses and other optical elements used in optical devices, especially those used in deep and vacuum ultraviolet photolithography involving using UV radiation having wavelength of, for example, but not limited to, 248 nm or shorter. The material system is particularly advantageous for use in connection with 248 nm, 193 nm and 157 nm photolithography as lens potting materials owing to its low outgassing even when exposed to high energy irradiation at such short wavelength. The material system is also particularly advantageous for use in optical devices involving using high-fluence irradiation at any wavelength, for example, but not limited to, about 365 nm. The fact that the material system is essentially free of silicone is particularly advantageous due to the contamination of optical surfaces that can be caused by those species. Silicone is known to be ubiquitous due to the widespread use in modern products and manufacture process. Therefore, in the fabrication or the material system of the present invention, care should be taken such that the environment should be essentially free of silicone. It is desired that the production of the material system for use in high precision optical devices and systems should be implemented in a clean room.

Thus accordingly, a third aspect of the present invention is a device comprising the cured material system of the present invention described above in general and below in detail as an adhesive or sealant. One embodiment of the device is an optical device. The optical device may include a lens assembly or lens element. In one embodiment the optical device comprises optical glass. Embodiments of the device include, but are not limited to, lithographic devices, semiconductor inspection devices such as lithographic inspection devices, etalons, and laser generators. The device may be used in connection with electromagnetic irradiation at any wavelength, including, for example, but not limited to, infrared, near infrared, visible, ultraviolet, deep ultraviolet and vacuum ultraviolet irradiation. In certain embodiments, the device is used in connection with irradiation shorter than about 500 nm. In certain other embodiments, the device is used in connection with irradiation shorter than about 400 nm. In certain other embodiments, the device is used in connection with irradiation shorter than about 300 nm. In certain embodiments, the device is used in connection with irradiation having high fluence, for example, higher than about 10 W/cm². In certain embodiments, the device is a lithographic device involving using deep or vacuum ultraviolet radiation shorter than about 250 nm. The device can be used in connection with irradiation having a wavelength as low as 157 nm, and even shorter. The cured material system of the present invention is advantageously used as lens potting material in the device of the present invention. The lens may be made of, for example, doped or undoped high purity fused silica, or crystalline $CaF_2$ optionally coated with antireflective coatings.

A fourth aspect of the present invention relates to a material system thermally curable at around room temperature when mixed together comprising the following parts:
  (1) a first part essentially free of cationic initiator comprising
    (1i) a cationically curable material component; and
  (2) a second part comprising the mixture of (2ii) a hydroxyl-containing component having at least two hydroxyl groups per molecule and (2iii) a cationic initiator component.

In certain embodiment of this material system of the present invention, in the first part (1), the cationically curable material component (1i) is based on a completely or substantially completely hydrogenated hydrocarbon based rubber material completely or substantially free of carbon-carbon double and triple bonds.

In certain embodiment of this material system of the present invention, in the second part (2), the cationic initiator component (2iii) has essentially no volatility at room temperature and also yielding products after polymerization that have minimal or no volatility at room temperature.

In certain other embodiments of this material system of the present invention, either the first part (1) or the second part (2) or both parts comprises an inert filler.

In certain other embodiment of this material system of the present invention, the first part (1) further comprises (2ii) a hydroxyl-containing component having at least two hydroxyl groups per molecule.

In certain other embodiment of this material system of the present invention, the first part (1) or the second part (2) or both parts comprises a viscosity adjustment component either homopolymerizable or capable of copolymerizing with the cationically curable material component of (1i) under curing conditions where (1) and (2) are mixed and allowed to cure.

In certain other embodiment of this material system of the present invention, the first part (1) consists of (1i), and the second part consists of (2ii) and (2iii), and the material system consists of the first part (1) and the second part (2).

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 1:
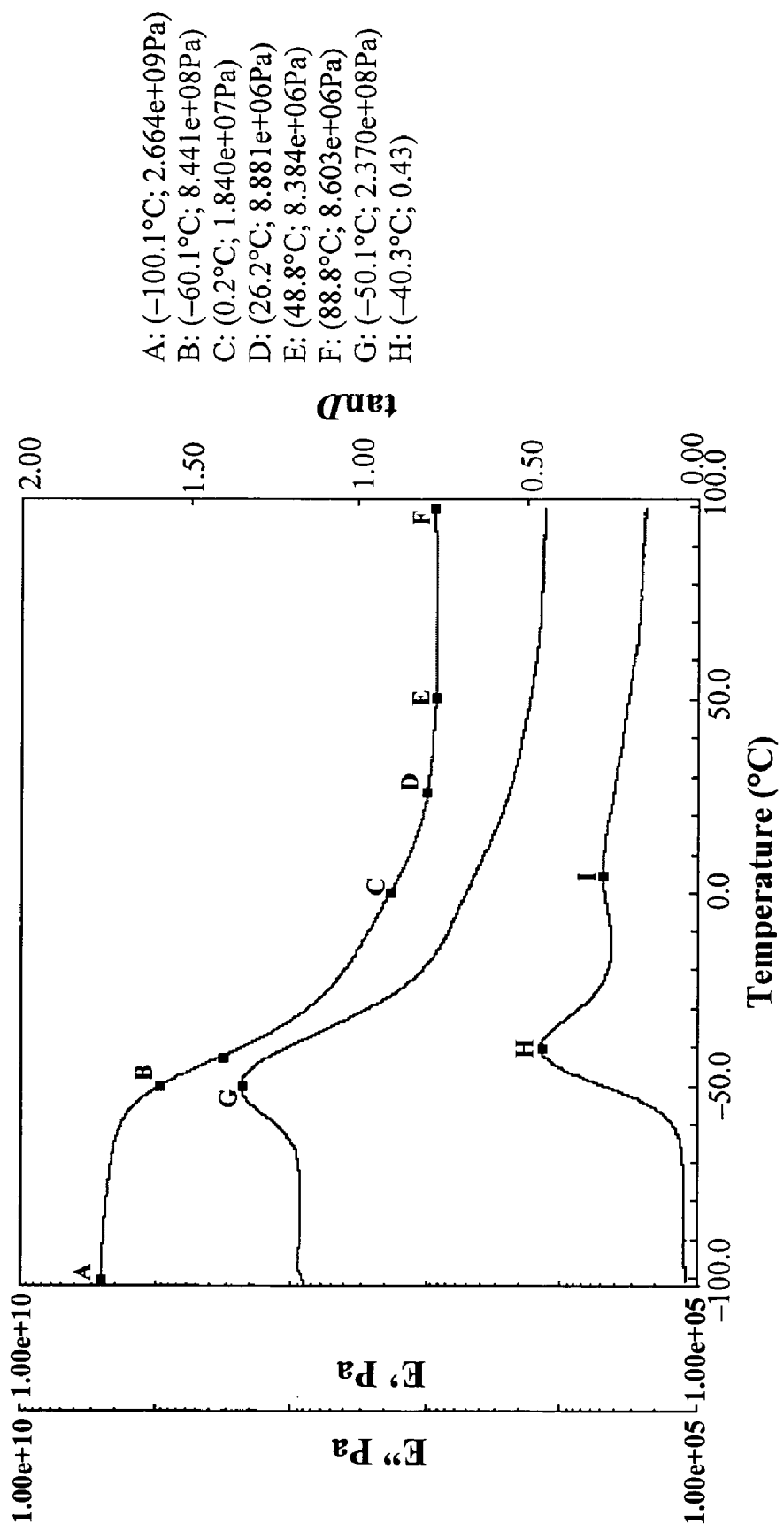
FIG. 1 presents the dynamic mechanical analysis curves of the cured material of Example 1, an embodiment of the material system of the present invention.

As used herein, the term "low out-gassing" means the cured material when subjected to ASTM-E-595-93 (1999) Standard Test Method for Total Mass Loss and Collected Volatile Condensable Material from Outgassing in a Vacuum Environment (NASA Reference Publication No. 1124), the material exhibits a Total Mass Loss of less than 2.00%, a Collected Volatile Condensable Materials of less than 0.20% and a Water Vapor Regain of less than 0.40%.

As used herein, the term "rubbery" or "low modulus" means that the cured material has a Young's modulus ranging from 25 to 10,000 psi ($1.7 \times 10^5$ to $6.8 \times 10^7$ Pa) at room temperature. A rubber material in the present application is a material that is rubbery.

As used herein, "room temperature" means 25° C. "About room temperature" means room temperature ±60° C.

As used herein, a material "based on completely or substantially completely hydrogenated hydrocarbon based rubber material" means the material has a backbone structure at least part of which consists of hydrocarbons that is completely or substantially completely hydrogenated. The material may comprise, however, terminal or pendant groups that are not completely hydrocarbon or completely hydrogenated.

The material system of the present invention contains as a first component a cationically curable material based on a completely or substantially hydrogenated hydrocarbon based rubber. The rubber can be based on, for example, polybutadiene, polyisoprene, polyethylene propylene rubber (EPR), and combinations thereof, and the like. The hydrocarbon chain of such rubber must be completely or substantially free of carbon-carbon double or triple bonds. Normally, this is achieved by hydrogenation of the rubber backbone. The hydrogenated rubber materials are functionalized with at least one group that renders the rubber molecules cationically polymerizable. An initiator may be necessary to initiate said polymerization. The polymerizable group on the hydrogenated rubber may be terminal or pendant. The group is cationically polymerizable. Examples of cationically polymerizable groups include, but are not limited to: cycloaliphatic epoxy, episulfide, epoxidized olefins, epoxy, glycidyl ether, oxirane, oxetane, propenyl ether, vinyl ether and compatible mixtures and/or combinations thereof, allyl ether, and the like. The preferred functional group is epoxy. In one embodiment of the material system of the present invention, the component (i) has a primary hydroxyl functionality at one end and an epoxidized diene functionality at the other end.

The hydrogenated rubber, if initially functionalized with hydroxyl, amino, or thiol groups, can be first reacted with an excess of a di- or triisocyanate functional compound to form the corresponding urethane, urea, or thiourethane compound. Then the material can be end-capped by reacting it with a hydroxyl functional molecule that also has a cationically polymerizable group (e.g., hydroxybutyl vinyl ether, etc). This type of functionalization of the hydrogenated rubber results in a urethane, urea, or thiourethane material with a hydrogenated rubber backbone and end-capped with cationically polymerizable functional groups.

The hydroxyl-containing component (ii) can be any hydroxyl-containing material with two or more hydroxyl functional groups per molecule. Standard diols, triols and polyols can be used. It is highly desired that the hydroxyl-containing component (ii) is not alkaline or does not contain alkaline functional groups such as $-NH_2$, $-NHR$, $-NR_1R_2$, and the like. It is also desired that this component do not contain functional groups that are easily hydrolyzed by acids, such as esters. Embodiments of component (ii) include, but are not limited to, ethoxylated bisphenol A, dimer diols, and polycarbonate diols. It is highly desired that the hydroxyl-containing component (ii) be present in an amount where the number of hydroxyl equivalents are less than the equivalents of the epoxy or other cationically polymerizable groups of component (i). In certain embodiments, it is desired the ratio of equivalents of epoxide or other cationically group to equivalents of hydroxyl groups should be between 1.5 and 10.

As to the initiator component (iii), it is highly desired to be capable of forming/generating cations either alone or when mixed with other materials at room temperature. Examples of such materials are, but not limited to, triarylcyclopropenylium salts, tetrakis(pentafluorophenyl) borate, gallate, aluminate, indate salts, and compatible mixtures and combinations thereof. The preferred component (iii) is triphenylcyclopropenylium hexafluoro antimonate. U.S. Pat. No. 6,420,460 to Zhang et al. discloses a family of triarylpropenylium salts as cationic polymerization initiators, the content of which is relied upon and incorporated herein by reference in its entirety. Without the intention or necessity to be bound by any particular theory, it is believed that such triarylpropenylium salts react with component (ii) to produce a strong acid, which is capable of thermally initiating the polymerization reactions of component (i) when combined with component (i). In order to obtain a low outgassing property of the finally cured polymer material, it is desired that the initiator component (iii) per se is non-volatile at room temperature, and after polymerization, the initiator does not yield volatile products at around room temperature. The amount of initiator component (iii) should be kept to a minimum amount to effect cure in a reasonable length of time. Typically, the amount of initiator component (iii) is in the 0.01 to 2% range by weight of the total weight of material system. In certain embodiments it is in the 0.02 to 1.5% range, and certain other embodiments it is within the 0.03 to 1% range.

For the purpose of longer shelf life of the material system of the present invention, it is desired that the initiator component (iii) is stored separately from the cationically polymerizable component (i). In certain embodiments, it is desired that the material system of the present invention before cure has two parts, with component (iii) stored together with at least part of component (ii) in one part, and component (i) stored in the other. Part of component (ii) may be mixed with component (i) without the presence of component (iii). Thus part of component (ii) may be added into component (i) to adjust its viscosity. Components (ii) and (iv), depending on their properties, may be distributed into either or both parts. A typical two-part solution of the material system of the present invention is a two-part syringe. Before application, the two parts are stored separately. During application, the two parts are combined and mixed, then allowed to cure.

The functionalized hydrogenated rubber material component (i), if a liquid of an acceptable viscosity for the desired application, can be mixed directly with the proper component (ii) and non-volatile initiator component (iii) and cured to the desired polymer material. If viscosity adjustment is necessary, any copolymerizable or simultaneously polymerizable component may be used. This component must be compatible with the hydrogenated rubber material. This component must not generate detrimental amount of volatile organic compounds during polymerization and during use after cure. Thus, inert organic solvents should generally be avoided.

Thermal curing without the need of actinic irradiation, such as UV, is highly desirable for the material system of the present invention.

However, it is not ruled out that the material system of the present invention may be photo- and electronic beam-polymerizable, in addition to its capability of thermal curing. Where photo-polymerization capability is desired, the following compounds, mixtures and compatible combinations thereof, in purified or diluted versions, may be advantageously used as the photoinitiators, in addition to the thermal initiators mentioned above, in the present invention:

oligo [2-hydroxy-2-methyl-1-[4-(1-methylvinyl)phenyl] propanone];
oligo [2-hydroxy-2-methyl-1-[4-(1-methylvinyl)phenyl] propanone], diluted in tripropylene glycol diacrylate (25% TPGDA);
1-[4-(4-benzoylphenylsulfonyl)phenyl]-2-methyl-2-(4-methylphenylsulfonyl)propan-1-one;
bis(2,4,6-trimethylbenzoyl)-phenyl phosphine oxide;
2-benzyl-2-N,N-dimethylamino-1-(4-morpholino-phenyl)-1-butanone;
bis $\eta^5$-(2,4-cyclopentadien-1-yl) bis(2,6-difluoro-3-(1H-pyrrol-1-yl)phenyl)titanium;
bis(2,6-dimethoxybenzoyl)-2,4,4-trimethylpentyl phosphine oxide;
2-oxepanone, homopolymer, 2-[[4-[2-methyl-2-(4-morpholinyl)-1-oxopropyl]phenyl]thio]ethyl ester;
mixture of 2-isopropylthioxanthone and 4-isopropylthioxanthone;
1,3-dimethyl-2-hydroxy-9H-thioxanthen-9-one, 2-ethylhexyl ester;
4,4'-bis(methylethylamino)benzophenone;
4,4'-bis(isopropylphenoxy)benzophenone;
4-benzoyl-4'-methyldiphenyl sulfide;
2-chloro-thioxanthone;
1-chloro-4-propoxythioxanthone;
2,4-diethylthioxanthone;
poly[oxy(methyl-1,2-ethanediyl)], α-[4-(dimethylamino) benzoyl-ω-butoxy-;
2,2'-bis-(2-chlorophenyl)-4,5,4',5'-tetraphenyl-2'H-<1, 2'>biimidazolyl;
(tolylcumyl)iodonium tetrakis(pentafluorophenyl) borate;
[4-[(2-hydroxytetradecyl)oxy]phenyl]phenyliodonium hexafluoro antimonate;
mixture of bis(4-dodecylphenyl)iodonium hexafluoroantimonate, isopropylthioxanthone, and $C_{12}+C_{14}$ alkylglycidyl ethers;
mixture of bis(4-dodecylphenyl)iodonium hexafluoroantimonate and $C_{12}+C_{14}$ alkylglycidyl ethers;
phenyl-4-octyloxyphenyl iodonium hexafluoro antimonite;
mixture of triaryl sulfonium hexafluoroantimonate salts; and
mixture of triaryl sulfonium hexafluorophosphate salts.

The following photosensitizers may be used as well in the material system of the present invention if desired:

perylene;
anthracene;
1,2-benzanthracene;
9-n-butoxyanthracene;
9,10-di-n-butoxy anthracene;
9,10-di-n-propoxy anthracene;
9,10-diethoxy anthracene;
anthrone;
pyrene;
2-ethyl-9,10-dimethoxy anthracene;
2,5-diphenyl-1,3,4-oxadiazole;
diphenyl anthracene;
9,10-dimethylanthracene;
1,3-diphenyl-2-pyrazoline;
1,3-diphenylisobenzofuran;
N,N,N',N'-tetraphenyl benzidine; and
N,N,N',N'-tetraphenyl phenylene diamine.

Similar to other sealants and adhesives, various fillers, particularly inorganic fillers can be used in the material system of the present invention. These fillers may be added to the composition to improve the physical properties of the cured product, and also to modify the rheology of the uncured materials. They can be reinforcing or non-reinforcing. Reinforcing filler may contain surface moieties capable of strong interactions with the cured polymer matrix. They may function to increase the strength and modulus of the cured adhesive. Understandably they may also alter the viscosity of the uncured composition. The extent of such effects is dependent on factors such as filler loading, particle size, shape, and surface chemistry. However, due to the mechanism of cationic polymerization when the material system of the present invention is cured, the filler should not be alkaline. As non-limiting examples of such non-alkaline fillers, mention can be made of alumina, crystobalite, clay, mullite, zircon, zirconia, quartz, silica, with or without surface modification and the like. Preferably, silica is used as the inert inorganic filler. The amount of the filler used can range from 0-90%, preferably 0-75%, more preferably 0-50%, by weight of the total composition. It is desired that particle size of the fillers should be less than 125 μm, in certain embodiments less than 50 μm, and in certain other embodiments less than 10 μm. Fillers can be distributed in the two parts if the material system is a two-part system described above. Pigments and dyes may be added as well in the material system of the present invention, as long as they do not negatively impact polymerization of the uncured material and the volatility of the cured material system.

Such inert filler particles may be surface coated or surface modified in order to adjust the interaction between the particles and the other components of the cured and uncured material system of the present invention. For example, the surface of the such particles may be grafted with functional groups capable of homopolymerization or co-polymerization with the other components of the material system, such as component (i) and/or (ii) in the presence of or in the absence of the initiator component (iii).

Other optional ingredients that can be added to the compositions such as to adjust for viscosity are low viscosity diluents. These diluents must contain at least one, and more preferably, at least two cationically curable functional groups. Examples of these are, but not limited to, bis{[1-ethyl (3-oxetanyl)]methyl}ether, cyclohexane dimethanol divinyl ether, limonene dioxide, terpinolene dioxide, vinyl cyclohexene dioxide, epoxidized vegetable oils, epoxidized vegetable oil esters, hydrogenated bisphenol A diglycidyl ether, and cyclohexane dimethanol diglycidyl ether.

A great advantage of the material system of the present invention is its capability of thermal curing at room temperature. Thus it can be conveniently used in affixing or attaching device components where UV cure is not possible or undesirable. In certain embodiments, the material system can be essentially completely thermally cured at room temperature within 2 weeks. In certain other embodiments, the material system can be essentially fully thermally cured at room temperature within 1 week. In certain other embodiments, the material system can be essentially fully thermally cured at room temperature within 48 hours. In certain other embodiments, the material system can be essentially fully thermally cured at room temperature within 2 hours. In certain other embodiments, the material can be essentially fully thermally cured within 1 hour at room temperature. In certain other embodiments, the material system of the present invention can be essentially fully thermally cured at room temperature within about 30 minutes. In certain other embodiments, the material system of the present invention can be essentially fully thermally cured at room temperature within about 15 minutes. As used herein, "essentially fully thermally cured" means that the Young's Modulus of the material system has reached at least 10%, in certain embodiments at least 20%, in certain embodiments at least 50%, in certain embodiments at least 80%, of the maximal Young's modulus obtainable for the material system after it is fully thermally at room temperature. It is highly desirable, and is possible, that the material of the present invention polymerizes at room temperature to an extent where objects affixed to the adhesives, when handled with reasonable care, does not detach from or cannot permanently move relative to the at least partly cured material, within 48 hours, in certain embodiments within 24 hours, in certain other embodiments within 12 hours, in certain other embodiments within 6 hours, in certain other embodiments within 3 hours, in certain other embodiments within 2 hours, in certain other embodiments within 1 hour. The cure process generally does not generate substantial heat, and can be carried out after the uncured composition has been applied. These advantages render the adhesive composition of the present invention particularly suitable for attaching elements of precision devices sensitive to high temperature and/or slight temperature fluctuations. For example, the optical elements in lithographic devices are required to be precisely aligned. It has been found that temperature variation of as low as +2° C. during lens potting process can be detrimental to the precise alignment of lens elements in the manufacture of certain lithographic devices. Thus, when the material system is used in the manufacture of high-precision devices, it is highly desirable that the material system is placed in an environment with essentially constant ambient temperature during cure.

The material system of the present invention, when formulated to be photo-curable, may be cured by visible light, UV radiation or by electron beam only, or in combination with the thermal cure, where necessary or desirable. One skilled in the art can choose the proper equipment and cure time to fully cure the formulation having the specific composition to a bulk material. For example, when using UV curing at 365 nm, the composition may be advantageously fully cured within 2 hours, preferably within 1 hour, more preferably within 30 minutes, most preferably within 15 minutes. The cure process can be effected at room temperature. It generally does not generate substantial heat, and can be carried out after the uncured composition has been applied. These advantages render the photo-curable adhesive composition of the present invention particularly suitable for attaching elements of precision devices sensitive to high temperature and temperature variation.

The cured product of the material system of the present invention advantageously has a low modulus ranging from 25 to 10,000 psi ($1.7 \times 10^5$ to $6.8 \times 10^7$ Pa), preferably from 50 to 5,000 psi ($3.4 \times 10^5$ to $3.4 \times 10^7$ Pa), more preferably from 100 to 2,500 psi ($6.8 \times 10^5$ to $1.7 \times 10^7$ Pa).

The adhesive material system of the present invention, upon being properly cured, is a low outgassing material at room temperature when exposed to solar radiation or typical lighting conditions. Therefore, a natural application of it is in clean room and similar environment where low outgassing is preferred or required.

It is expected that the adhesive composition after cure of the present invention even does not outgas substantially when directly exposed to high energy UV light at wavelength as short as about 248, 193 and even 157 nm for a prolonged period of time and that the outgassed material, in their relatively small amounts, do not tend to contaminate lithographic lens surfaces. The present inventors also discovered that even when used with high fluence irradiation, irrespective of the wavelength, the cured adhesive material of the present invention does not outgas substantially, and the outgassed species do not tend to migrate to contaminate the clean optical surfaces required in many optical devices and systems.

As indicated supra it is well known that the lenses used in deep and vacuum UV photolithography, such as at about 193 nm and 157 nm, particularly at 157 nm, contamination of the lens surface ($CaF_2$ lenses in 157 nm lithography, for example) can reduce the transmission of the lithographic illumination radiation and thus is highly undesirable. Room temperature curable silicone sealants are notorious for outgassing, migration, and strong tendency to contaminate lens surfaces and thus cannot be directly used in these settings. It has been reported that at high fluence, even at relatively long wavelength, such as about 365 nm, traditional lens potting material, such as RTV silicone rubber lens-potting materials tend to migrate and contaminate lens surfaces. Though RTV silicone rubber lens-potting materials are regarded as acceptable at relatively longer wavelength applications, such as 365 nm when relatively small fluence of irradiation is involved, the deteriorated migration and contamination at high fluence renders them less desirable. This is especially true for high precision systems, such as semiconductor inspection systems. Such migration and contamination problem requires the light path to be well purged. In addition, the contamination of lens surfaces by RTV silicone rubber is irreversible, making them even more problematic. Migration of RTV silicone rubber material and thus contamination of lens surfaces at short wavelength, such as 157 nm, render them inappropriate for use even in applications where only small fluence of irradiation is involved. For the purpose of the present application, "high fluence" means fluence higher than 10 W/cm$^2$.

Since the properly cured adhesive composition of the present invention has low outgassing, the outgassed species do not tend to contaminate lens surfaces, and the properly cured adhesive composition does not tend to migrate to contaminate lens surfaces, even when directly exposed to high fluence and/or short wavelength such as UV radiation at 157 nm, it is ideal for use in all devices requiring clean surfaces, especially optical devices, particularly lithographical devices at short wavelengths such as deep and vacuum ultraviolet radiation of 248 nm or shorter. It may be used to attach and join various components of these devices. Particularly, it is highly advantageous when used as lens potting materials to securely fix the lens elements in their housings. Those lenses may be made of high purity fused silica, doped or undoped, or CaF$_2$ or other materials. The lens surfaces may be coated with antireflective coatings, such as magnesium fluoride, aluminum fluoride, calcium fluoride, gadolinium fluoride, thorium fluoride, lanthanum fluoride, yttrium fluoride, neodymium fluoride, dysprosium fluoride, sodium aluminum fluoride, alumina, silica, fluorine-containing silica, hafnia, scandium oxide, thorium oxide, titania, zirconia, yttria, and the like. When used as lens potting material, the adhesive composition of the present invention can, for example, be applied to the desired locations of the lens element or lens housing before cure before or after the lens element is carefully aligned. The adhesive composition is subsequently allowed to thermally cure at a stable temperature around the room temperature, thereby affixing the lens elements. Where the material system of the present invention is photo-curable, it may be exposed to visible or UV curing light or electron beam for a short period of time, thereby attaching and fixing the lens element to the housing. Such devices, especially the lithographic devices, comprising the cured material system of the present invention, constitute an aspect of the present invention.

Thus accordingly, the device of the present invention comprises the cured material system of the present invention described above as an adhesive or sealant. The device is advantageously an optical device. The optical device may include a lens assembly or lens element. The device may be advantageously a lithographic device, a lithographic inspection device, an etalon, a laser generator, and the like. The device may be used in connection with electromagnetic irradiation at any wavelength, including, for example, but not limited to, infrared, near infrared, visible, ultraviolet, deep ultraviolet and vacuum ultraviolet irradiation. In certain embodiments, the device is used in connection with irradiation shorter than 500 nm. In certain other embodiments, the device is used in connection with irradiation shorter than about 400 nm. In certain other embodiments, the device is used in connection with irradiation shorter than about 300 nm. Advantageously, the device is used in connection with irradiation having high fluence, for example, over 10 W/cm$^2$, in certain embodiments over 50 W/cm$^2$, in certain other embodiments over 100 W/cm$^2$, still in certain other embodiments over 200 W/cm$^2$. Certain semiconductor inspection system uses fluence higher than 200 W/cm$^2$. It is highly desired that such system is or comprises the device of the present invention. The present invention device is advantageously a lithographic device involving using deep or vacuum ultraviolet radiation shorter than about 250 nm. The device can be used in connection with irradiation having a wavelength as low as 157 nm, and even shorter. The cured material system is advantageously used as lens potting material in the device of the present invention. The lens may be made of, for example, doped or undoped high purity fused silica, or crystalline CaF$_2$, optionally coated with antireflective coatings. The device of the present invention advantageously requires minimal or no purging of the light path when in use.

The device of the present invention, if an optical device, may comprise at least one reflective or refractive optical member. A reflective member may comprise a reflective surface made of metal or non-metal materials. Where a refractive optical member is involved, it generally comprises a glass or crystalline material transmissive to the irradiation used in connection with the device. Glass materials may include, for example, typical glass materials for use in i-line, g-line, 248 and 193 nm lithography, including, but not limited to, borosilicate glasses, doped or undoped fused silica glass, and the like. Examples of optical crystalline materials include, but are not limited to, crystals of CaF$_2$, MgF$_2$, polarizing crystals, and the like, as well as transparent glass-ceramic materials.

The present invention is further illustrated by the following examples, which is for illustration purpose only and shall not be interpreted to limit the present invention as claimed in any way.

EXAMPLES

Example 1

The Present Invention

The following A and B compositions were prepared:
Composition A:

58.00% Kraton Liquid Polymer L-207 from Kraton
   This is a hetero-telechelic polymer consisting essentially of a hydrogenated polybutadiene polymer that has a primary hydroxyl functionality on one end and an epoxidized isoprene functionality at the other end.
4.00% OXT-221 bis{[1-ethyl(3-oxetanyl)]methyl}ether from Toagosei Co., Ltd., Nagoya, Japan.
38.00% TJFS05 Silica powder (4F International Co., Greenville, FL.) surface treated with 0.5% Silquest A-186 (beta-(3,4-epoxy cyclohexyl) ethyl trimethoxy silane) from GE OSi Specialties, Greenwich, CT.

Composition B:

49.00% Bisphenol A ethoxylate (2EO/phenol) from Sigma Aldrich Inc., St. Louis, MO.
50.00% TJFS05 Silica powder from 4F International Co., Gainesville, FL.
1.00% Triphenylcyclopropenylium hexafluoroantimonate from Spectra Group, Millbury, OH.

Compositions A and B were made by weighing the substituents into a 100 mL reaction kettle. A glass stirring shaft and Teflon® stirrer were inserted into the kettle. The kettle lid was attached and the whole apparatus placed into a 60° C. oil bath. The ingredients were mixed for 15 minutes. The kettle was then removed from the oil bath and the mixture was poured and scraped onto a 3 roll mill. After milling, Composition A was transferred into the "10" part of a 10:1 two-part syringe and Composition B was transferred to the "1" part. Centrifugation was done to remove air bubbles. The material was then dispensed through a static mixer onto the bottom (~3 mm deep) of a plastic 20 cm³ scintillation vial under nitrogen. The sample was left under nitrogen for 7 days then removed from the vial and post baked for 8 hours at 60° C.

The sample was then subjected to ASTM-E-595-93 (1999) Standard Test Method for Total Mass Loss and Collected Volatile Condensable Materials from Outgassing in a Vacuum Environment (NASA Reference Publication No. 1124). The results (presented in TABLE I below) show the above cured Example 1 composition passes all three of the specifications of this test.

TABLE I

|  | Example | Specification |
|---|---|---|
| % Total Mass Loss | 0.579% | <1.00% |
| % Collected Volatile Condensable Materials | 0.090% | <0.10% |
| % Water Vapor Regain | 0.075% | <0.20% |

Another piece of the above cured polymer of Example 1 was subjected to a Thermal Desorption/GCMS outgassing test as follows:

The cured Example 1 material was run neat using Gerstel Thermal Desorption/GCMS. The material was cut into small pieces and a pre-weighed amount of sample was placed in an empty 7.0 inch long×6.0 mm O.D. glass cartridge. The material was offgassed at 25° C. for 60 minutes in a helium atmosphere. The 25° C. thermally desorbed VOC's were cryogenically collected over the 60.0 minutes desorption time period using a constant 15.0 ml/minute helium purge. The offgassed volatiles were identified using the GCMS.

The composition of Example 1 was dispensed from a 10:1 two-part syringe through a static mixer onto a PET film. The material was drawn down onto the PET film using a 6 mil Bird applicator. The dispensing and drawdown were done in a glovebag under nitrogen. The drawdown film was allowed to set for 7 days under nitrogen. The film was removed from the PET film and hung in a 60° C. forced air oven for 8 hours. Samples were cut from this film (~10 mm×11 mm) for Dynamic Mechanical Analysis (DMA). FIG. 1 shows the DMA curves. Note the low $T_g$ (peak tanδ=−40.3° C. (major), 4.7° C. (minor)) and low modulus (9.881 MPa) indicative of a soft rubber.

Figure 2:
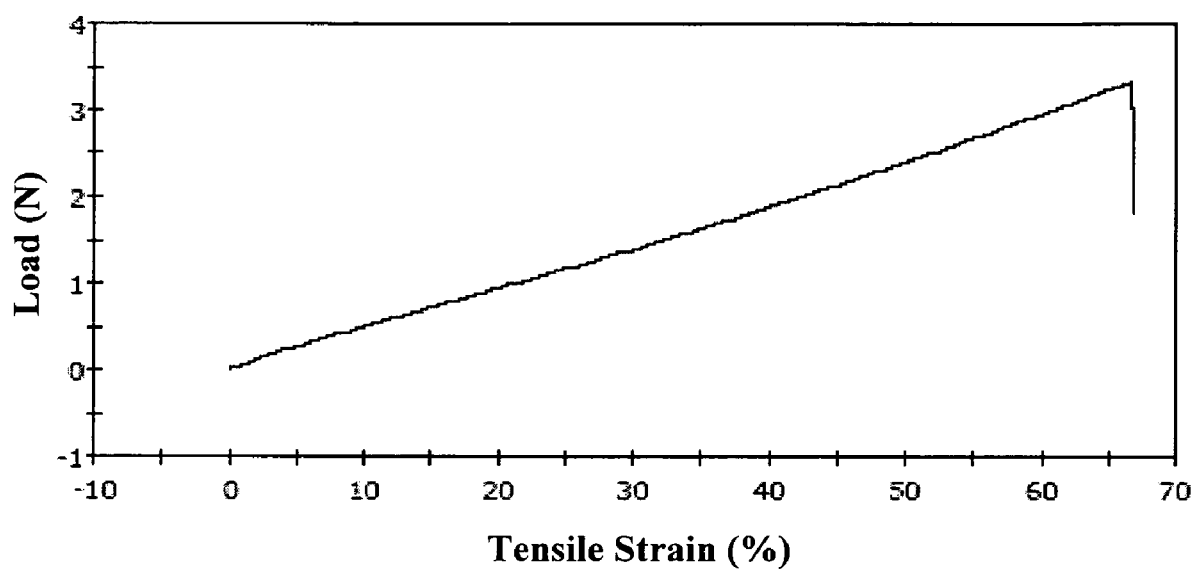
FIG. 2 presents the tensile/strain curve of the cured material of Example 1.

The composition of Example 1 was dispensed from a 10:1 two-part syringe through static mixer into a syringe with a 21 gauge needle. The syringe was connected to a piece of 0.032 inch (inner diameter) Teflon® tubing. The syringe was pressurized and the tubing filled with the composition. The composition was allowed to cure for 7 days in the tubing. Then, the tubing was carefully slit with a razor blade and the cured rod of material removed from the tubing. Five cured rods of the material were hung in a forced air oven at 60° C. for 8 hours. The rods were then tested for tensile properties according to ASTM D882-01 on an Instron Model 4202 Tensile Tester. A typical stress/strain curve is shown in FIG. 2. Note the linear curve with no inflection points (yields) indicative of a rubber. The average results for the 5 rods tested were: Young's modulus=12.42 MPa (1801 psi), tensile strength=6.41 MPa (929 psi), and an elongation at break of 59.91%.

The outgassing property of the cured material of this Example 1 when exposed to high energy irradiation at approximately 193 nm was further evaluated. Essentially, the curable composition of the present invention was used as a lens potting compound in affixing certain high purity synthetic silica glass lens elements in a stainless steel housing in substantially the same way as described in United States Patent Application Publication No. 2004/0092618 A1, particularly from page 7, paragraph [0126] to page 8, paragraph [00136]. The lens assembly was subsequently subjected to excimer laser beam in substantially the same way as described in this same part of United States Patent Application Publication No. 2004/0092618 A1, with the exception that the excimer laser used for testing Example 1 of the preset invention had a wavelength of approximately 193 nm, not about 157 nm. The outgassed species and amounts of outgassing were characterized in substantially the same ways as described in this same part of United States Patent Application Publication No. 2004/0092618 A1. Results of the before-window and after-window outgassing data after 48 hours of exposure to 193 nm excimer laser are presented in TABLE II below. Included in TABLE II are two additional examples (Example C1 and Example C2) known to have exceedingly low outgassing when exposed to high energy irradiation. Example C1 is Example No. 4 reported in TABLE III of page 8 of United States Patent Application Publication No. 2004/0092618 A1. Data presented of Example C1 are those of the sample upon 48 hours of exposure to 157 excimer laser. Example C2 is another UV-curable composition (outside of the present invention because it is not room-temperature thermally-curable) known to have exceedingly low outgassing when exposed to excimer laser at about 193 nm. The outgassing data of Example C2 are those obtained after the material was applied as lens potting compound, subsequently UV cured and exposed to 193 nm excimer laser beam, much similar to what was done for Example 1 of the present invention. From the data in TABLE II, it is clear that the composition of Example 1 of the present invention has exceedingly low outgassing rate upon prolonged exposure to high energy irradiation at about 193 nm.

TABLE II

|  | Total VOC Concentration (ppb) | |
|---|---|---|
| Example | Before Window | After Window |
| Example 1 | 0.31 | 1.61 |
| Example C1 | 2.60 | 3.27 |
| Example C2 | 0.87 | 3.27 |

Example 2

The Present Invention

Example 2 uses the same Composition A as Example 1. Composition B:

---

59.00% Bisphenol A ethoxylate (2EO/phenol) from Sigma Aldrich Inc., St. Louis, MO.

-continued

| | |
|---|---|
| 40.00% | TJFS05 Silica powder from 4F International Co., Gainesville, FL. |
| 1.00% | Triphenylcyclopropenylium hexafluoroantimonate from Spectra Group, Millbury, OH. |

Composition B was made just as in Example 1. Compositions A and B were there transferred to a 10:1 two-part syringe, dispensed and cured just as in Example 1. The cured sample was subjected to the ASTM E-595-93 (1999) outgassing test. Data of the test results presented in TABLE III below indicate that the cured material passed the test.

TABLE III

| | Example 2 | Specification |
|---|---|---|
| % Total Mass Loss | 0.634% | <1.00% |
| % Collected Volatile Condensable Materials | 0.064% | <0.10% |
| % Water Vapor Regain | 0.073% | <0.20% |

Figure 3:
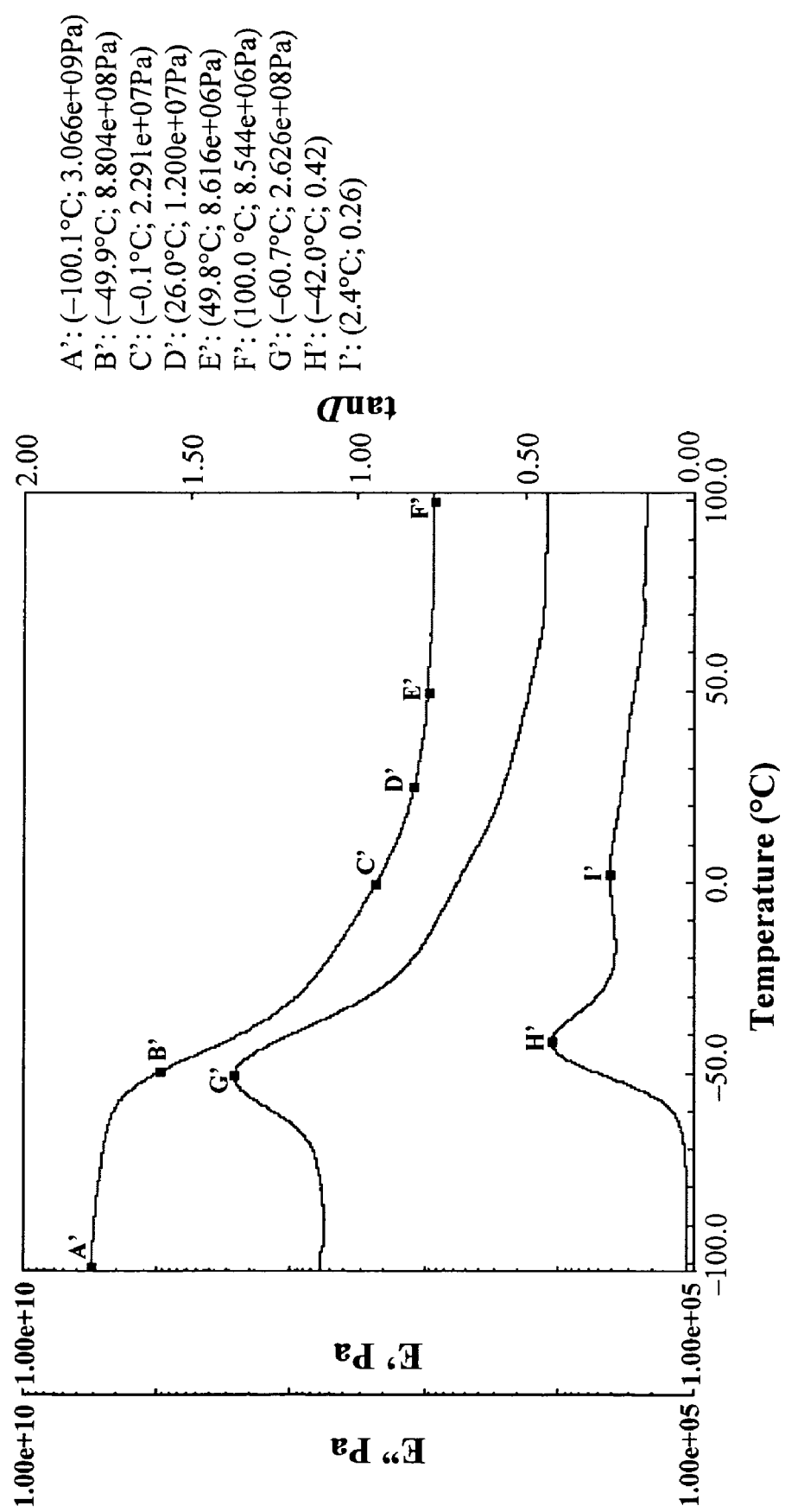
FIG. 3 presents the dynamic mechanical analysis curves of the cured material of Example 2, another embodiment of the material system of the present invention.

DMA films were prepared with the Example 2 compositions just as in Example 1. The results are in FIG. 3. Again, note the low $T_g$ (peak $\tan\delta = -42.0°$ C. (major), 2.4° C. (minor)) and low modulus (12.0 MPa) indicative of a soft rubber.

Example 3

The Present Invention

Example 3 uses the same composition B as Example 1.
Composition A:

| | |
|---|---|
| 53.00% | Kraton Liquid Polymer L-207. |
| 7.00% | OXT-221 bis{[1-ethyl(3-oxetanyl)]methyl}ether from Toagasei Co., Ltd., Nagoya, Japan. |
| 40.00% | TJFS05 Silica powder (4F International Co., Greenville, FL.) surface treated with 0.5% Silquest A-186 (beta-(3,4-epoxy cyclohexyl) ethyl trimethoxy silane) from GE OSi Specialties, Greenwich, CT. |

Composition A was made just as in Example 1. Compositions A and B were transferred to a 10:1 two-part syringe, dispensed and cured just as in Example 1. The cured sample was subjected to the ASTM E-595-93 (1999) outgassing test. Data of the test results presented in TABLE IV below indicate that the cured material passed the test.

TABLE IV

| | Example | Specification |
|---|---|---|
| Total Mass Loss | 0.461% | <1.00% |
| % Collected Volatile Condensable Materials | 0.088% | <0.10% |
| % Water Vapor Regain | 0.104% | <0.20% |

Example 4

The Present Invention

The following compositions A and B were prepared:
Composition A:

| | |
|---|---|
| 54.00% | Kraton Liquid Polymer L-207 from Kraton Polymers This is a hetero-telechelic polymer consisting of a hydrogenated polybutadiene polymer that has a primary hydroxyl functionality on one end and an epoxidized isoprene functionality at the other end. |
| 8.00% | OXT-221 bis{[1-ethyl(3-oxetanyl)]methyl}ether from Toagasei Co., Ltd., Nagoya, Japan. |
| 38.00% | AngstromSphere SIO2P050-01 Silica powder (from Fiber Optic Center Inc., New Bedford, MA) surface treated with 0.5% Silquest A-186 (beta-(3,4-epoxy cyclohexyl) ethyl trimethoxy silane) from GE OSi Specialties, Greenwich, CT. |

Composition B:

| | |
|---|---|
| 54.00% | Bisphenol A ethoxylate (2E0/phenol) from Sigma Aldrich Inc., St. Louis, MO. |
| 45.00% | AngstromSphere SIO2P050-01 Silica powder (from Fiber Optic Center Inc., New Bedford, MA) surface treated with 0.5% Silquest A-137 octyltriethoxy silane) from GE OSi Specialties, Greenwich, CT. |
| 1.00% | Triphenylcyclopropenylium hexafluoroantimonate from Spectra Group, Millbury, OH. |

In this Example 4, Compositions A and B were prepared, transferred into a 10:1 two-part syringe, and dispensed through a static mixer into a plastic 20 cm³ scintillation vial just as in Example 1. The sample cures to a rubbery solid in 24 hours.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A material system essentially free of silicone consisting essentially of the following components, or a mixture, a blend or a reaction product thereof:
   (i) a cationically curable material component comprising the backbones of a completely or substantially completely hydrogenated hydrocarbon based rubber material completely or substantially free of carbon-carbon double and triple bonds, wherein the cationically curable component is a functionalized material selected from the group consisting of: functionalized polybutadiene, functionalized polyisoprene, functionalized polyethylene propylene rubber and combinations thereof, and wherein the functionalized material comprises a backbone completely hydrogenated or substantially completely hydrogenated and completely or substantially completely free of carbon-carbon double and triple bonds;
   (ii) a hydroxyl-containing component having at least two hydroxyl groups per molecule;
   (iii) an initiator component having essentially no volatility at room temperature and also yielding products after polymerization that have minimal or no volatility at room temperature;

(iv) an optional viscosity adjustment component either homopolymerizable or capable of copolymerizing with the cationically curable material component of (i); and (v) an optional non-alkaline inert filler;

wherein when all the components are mixed together, the material system is thermally curable at around room temperature to form a rubbery polymer material that is low-outgassing at room temperature.

2. A material system in accordance with claim 1, wherein the cationically curable material component of (i) is functionalized by at least one polymerizable terminal or pendant group selected from: cycloaliphatic epoxy, episulfide, epoxidized olefins, epoxy, glycidyl ether, oxirane, oxetane, propenyl ether, vinyl ether and compatible mixtures and/or combinations thereof.

3. A material system of claim 1, wherein component (i) is a polymer having a primary hydroxyl functionality at one end and an epoxidized diene functionality at the other end.

4. A material system in accordance with claim 2, wherein the cationically curable material component of (i) is functionalized by at least one epoxy terminal or pendant group.

5. A material system in accordance with claim 1, wherein the hydroxyl-containing component (ii) does not contain an alkaline group.

6. A material system in accordance with claim 1 wherein the ratio of the equivalents of the cationically polymerizable groups ($E_c$) in component (i) to the equivalents of hydroxyls ($E_h$) in the hydroxyl-containing component (ii) ($E_c/E_h$) is higher than 1.

7. A material system in accordance with claim 6, wherein the ratio of the equivalents of the cationically polymerizable groups ($E_c$) in component (i) to the equivalents of hydroxyls ($E_h$) in the hydroxyl-containing component (ii) ($E_c/E_h$) is between 1.5 and 10.

8. A material system in accordance with claim 1, wherein the initiator component (iii) is selected from the following compounds and/or mixtures in purified and/or diluted form:
triarylcyclopropenylium salts;
tetrakis(pentafluorophenyl) borate, gallate, aluminate and indate salts; and compatible mixtures and/or combinations thereof.

9. A material system in accordance with claim 1, wherein the initiator component consists essentially of triphenylcyclopropenylium hexafluoro antimonate.

10. A material system in accordance with claim 1, wherein the non-alkali inert filler is an inorganic filler selected from the group consisting of alumina, crystobalite, clay, mullite, zircon, zirconia, quartz, silica, with or without surface modification, and compatible mixtures and combinations thereof.

11. A material system in accordance with claim 1, which is thermally cured at around room temperature.

12. A material system in accordance with claim 1, which is also photo and/or electron beam curable.

13. A material system in accordance with claim 1, which forms a cured polymer after thermal curing at around room temperature having a $T_g$ of equal to or lower than 25° C.

14. A material system in accordance with claim 1, which comprises two separate parts, with component (i) comprised in the first part, and components (ii) and (iii) comprised in the second part.

15. A process for producing a cured material system having low outgassing rate and low modulus between 25 and 10,000 psi ($1.7 \times 10^5$ to $6.8 \times 10^7$ Pa) and essentially free of silicone, comprising the following steps of:

(A) providing a cationically polymerizable material (i), said cationically polymerizable material comprising the backbone of a completely or substantially completely hydrogenated hydrocarbon rubber material completely or substantially completely free of carbon-carbon double bond and triple bond, wherein the cationically polymerizable material is a functionalized material selected from the group consisting of: functionalized polybutadiene, functionalized polyisoprene, functionalized polyethylene propylene rubber and combinations thereof, and wherein the functionalized material comprises a backbone completely hydrogenated or substantially completely hydrogenated and completely or substantially completely free of carbon-carbon double and triple bonds;

(B) mixing the cationically polymerizable material (i) with an initiator (ii) having essentially no volatility at room temperature and also yielding products after polymerization that have minimal or no volatility at room temperature; a hydroxyl-containing component (iii) comprising at least two hydroxyls per molecule; and an optional non-alkaline inert filler (iv); and (C) thermally curing the mixture resulting from step (B) at about room temperature to form a material system having low outgassing rate and low modulus.

16. A process in accordance with claim 15, wherein step (A) comprises the following steps:

(A1) providing a material (i') having reactive terminal and/or pendant groups, wherein said material (i') comprises the backbone of a completely or substantially completely hydrogenated hydrocarbon-based rubber completely or substantially completely free of carbon-carbon double bond and triple bond; and (A2) modifying the rubber material (i') into material (i) by introducing cationically polymerizable terminal and/or pendant groups to the rubber material (i') by allowing the reactive terminal and/or pendant groups of (i') to react with agents capable of producing cationically-polymerizable groups at the location of the reactive terminal and/or pendant groups.

17. A device comprising, as an adhesive or sealant material, a cured material system which is rubbery and low-outgassing at room temperature, where said cured material system is essentially free of silicone and consists essentially of a mixture, a blend or a reaction product of the following components:

(i) a cationically curable material component comprising the backbone of a completely or substantially completely hydrogenated hydrocarbon-based rubber material completely or substantially free of carbon-carbon double and triple bonds, wherein the cationically curable material component is a functionalized material selected from the group consisting of: functionalized polybutadiene, functionalized polyisoprene, functionalized polyethylene propylene rubber and combinations thereof, wherein the functionalized material comprises a backbone completely hydrogenated or substantially completely hydrogenated and completely or substantially completely free of carbon-carbon double and triple bonds, and wherein the cationically curable material is curable at about room temperature;

(ii) a hydroxyl-containing component having at least two hydroxyl groups per molecule;

(iii) an initiator component having essentially no volatility at room temperature and also yield products after polymerization that have minimal or no volatility at room temperature;

(iv) an optional viscosity adjustment component either homopolymerizable or capable of copolymerizing with the photo or electron beam curable material component of (i); and (v) an optional non-alkaline inert filler.

18. A device in accordance with claim 17, wherein the cationically curable material component of (i) is a functionalized material selected from the group consisting of: functionalized polybutadiene, functionalized polyisoprene, functionalized polyethylene propylene rubber and combinations thereof, which material is completely hydrogenated or substantially completely hydrogenated and completely or substantially completely free of carbon-carbon double and triple bonds.

19. A device in accordance with claim 17, wherein the cationically curable material component of (i) is functionalized by at least one polymerizable terminal or pendant group selected from: cycloaliphatic epoxy, episulfide, epoxidized olefins, epoxy, glycidyl ether, oxirane, oxetane, propenyl ether, vinyl ether and compatible mixtures and/or combinations thereof.

20. A device in accordance with claim 15, wherein the cationically curable material component of (i) is functionalized by at least one epoxy terminal or pendant group.

21. A device in accordance with claim 17, wherein the photoinitiator/photosensitizer in the material system is selected from the following compounds and/or mixtures in purified and/or diluted form:

triarylcyclopropenylium salts;

tetrakis(pentafluorophenyl) borate, gallate, aluminate and indate salts;

and compatible mixtures and/or combinations thereof.

22. A device in accordance with claim 17, wherein the initiator component consists essentially of triphenylcyclopropenylium hexafluoro antimonate.

23. A device in accordance with claim 17, wherein the non-alkali inert filler is an inorganic filler selected from the group consisting of alumina, crystobalite, clay, mullite, zircon, zirconia, quartz, silica, and compatible mixtures and combinations thereof.

24. A device in accordance with claim 17, wherein the cured material system has a $T_g$ of equal to or lower than 25° C.

25. A device in accordance with claim 17, which is an optical device.

26. A device in accordance with claim 17, which is for use in connection with electromagnetic irradiation at a high fluence.

27. A device in accordance with claim 17, which is for use in connection with electromagnetic irradiation having a wavelength less than 500 nm.

28. A device in accordance with claim 23 which is a lithographic device involving using deep and/or vacuum ultraviolet irradiation.

29. A device in accordance with claim 23 wherein the wavelength of the lithographic radiation is approximately 157 nm or shorter.

30. A device in accordance with claim 24, wherein the lens material is doped or undoped high purity fused silica or crystalline $CaF_2$, optionally coated with antireflective material selected from the group consisting of: magnesium fluoride, aluminum fluoride, calcium fluoride, gadolinium fluoride, thorium fluoride, lanthanum fluoride, yttrium fluoride, neodymium fluoride, dysprosium fluoride, sodium aluminum fluoride, alumina, silica, fluorine-containing silica, hafnia, scandium oxide, thorium oxide, zirconia, yttria, and compatible combinations thereof.

31. A device in accordance with claim 17 having at least one lens element and the cured material system is used as lens potting material.

32. A device in accordance with claim 17, wherein minimal or no purging of the light path is required.

33. A device in accordance with claim 17, which is selected from the group consisting of stepper lens, stepper lens assembly, semiconductor inspection device, etalon and laser generator.

* * * * *